(12) United States Patent
Smith

(10) Patent No.: US 10,627,621 B2
(45) Date of Patent: Apr. 21, 2020

(54) HEADS-UP DISPLAY SYSTEM

(71) Applicant: Nissan North America, Inc., Franklin, TN (US)

(72) Inventor: Joshua Smith, Birch Run, MI (US)

(73) Assignee: Nissan North America, Inc., Franklin, TN (US)

( * ) Notice: Subject to any disclaimer, the term of this patent is extended or adjusted under 35 U.S.C. 154(b) by 23 days.

(21) Appl. No.: 15/993,274

(22) Filed: May 30, 2018

(65) Prior Publication Data
US 2019/0369396 A1  Dec. 5, 2019

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01); *G02B 27/0179* (2013.01); *B60K 2370/334* (2019.05); *B60K 2370/52* (2019.05); *B60K 2370/77* (2019.05); *G02B 2027/011* (2013.01); *G02B 2027/0138* (2013.01); *G02B 2027/0141* (2013.01); *G02B 2027/0159* (2013.01); *G02B 2027/0185* (2013.01); *G02B 2027/0187* (2013.01)

(58) Field of Classification Search
CPC ............ G02B 27/0149; G02B 27/0101; G02B 27/0179; G02B 2027/011; G02B 2027/0138; G02B 2027/0141; G02B 2027/0159; G02B 2027/0185; G02B 2027/0187; B60K 35/00; B60K 2370/52; B60K 2370/334; B60K 2370/77
See application file for complete search history.

(56) References Cited

U.S. PATENT DOCUMENTS

| 7,271,960 | B2 | 9/2007 | Stewart et al. | |
| 9,405,120 | B2 | 8/2016 | Graf et al. | |
| 2008/0079753 | A1* | 4/2008 | Victor | G01C 21/365 345/660 |
| 2016/0125631 | A1* | 5/2016 | Ham | G02B 27/0179 345/633 |
| 2017/0108862 | A1* | 4/2017 | Mikkelsen | B60W 30/09 |
| 2018/0120562 | A1* | 5/2018 | Yata | G02F 1/0136 |
| 2018/0157035 | A1* | 6/2018 | Fujita | B60K 35/00 |
| 2018/0166047 | A1* | 6/2018 | Yamazato | G09G 3/002 |
| 2019/0139286 | A1* | 5/2019 | Shimoda | B60K 35/00 |

* cited by examiner

*Primary Examiner* — Stephen G Sherman
(74) *Attorney, Agent, or Firm* — Global IP Counselors, LLP

(57) ABSTRACT

A heads-up display system includes a re-positionable projector that projects an image of data to any one of a plurality of image positions on a windshield. With the image being centered in front of a vehicle operator, the image defines a predetermined aspect ratio. An electronic controller is configured to compensate for distortion of the image and maintain the predetermined aspect ratio in response to the image being moved away from the centered position.

17 Claims, 15 Drawing Sheets

HEADS-UP DISPLAY SYSTEM

BACKGROUND

Field of the Invention

The present invention generally relates to a heads-up display system for a motor vehicle. More specifically, the present invention relates to heads-display system with a projector that can project an image of data to any of a plurality of locations on to a windshield or a screen and compensate for distortion of the image when the image is projected to a surface that is at an oblique angle relative to the optical axis of the projector.

Background Information

Heads-up displays are being installed to motorized vehicles.

SUMMARY

One object of the present disclosure is to provide a heads-up display with a projector that can project to any of a plurality of image positions on a screen or windshield.

Another object of the present disclosure is to provide the heads-up display with distortion compensation in order to maintain a predetermined aspect ratio of the projected image including instances where the image is projected to a surface that is at an oblique angle relative to the optical axis of the projector.

In view of the state of the known technology, one aspect of the present disclosure is to provide a heads-up display system with a vehicle, a display assembly and an electronic controller. The vehicle has a vehicle body structure that includes a windshield and defines a passenger compartment with a vehicle operator seat. The display assembly is installed to a portion of the vehicle body structure within the passenger compartment. The display assembly is configured to display images of least one of driving related information and vehicle related information such that the images are visible to a vehicle operator in the vehicle operator seat while looking at or through the windshield of the vehicle. The display assembly is further configured to change position of the images relative to the vehicle operator between any one of a plurality of predetermined areas relative to the windshield, including at least a first position centered in front of the vehicle operator, a second position left of first position and a third position right of the first position. The image defines a predetermined aspect ratio with in the first position. The electronic controller is installed within the vehicle and is electrically connected to the projection device. The electronic controller is configured to operate the display assembly to selectively move the image between the plurality of predetermined areas of the windshield including the first, second and third positions. The electronic controller is further configured to compensate for distortion of the image and maintain the predetermined aspect ratio in response to the image being moved away from the first position toward or to either of the second and third positions.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
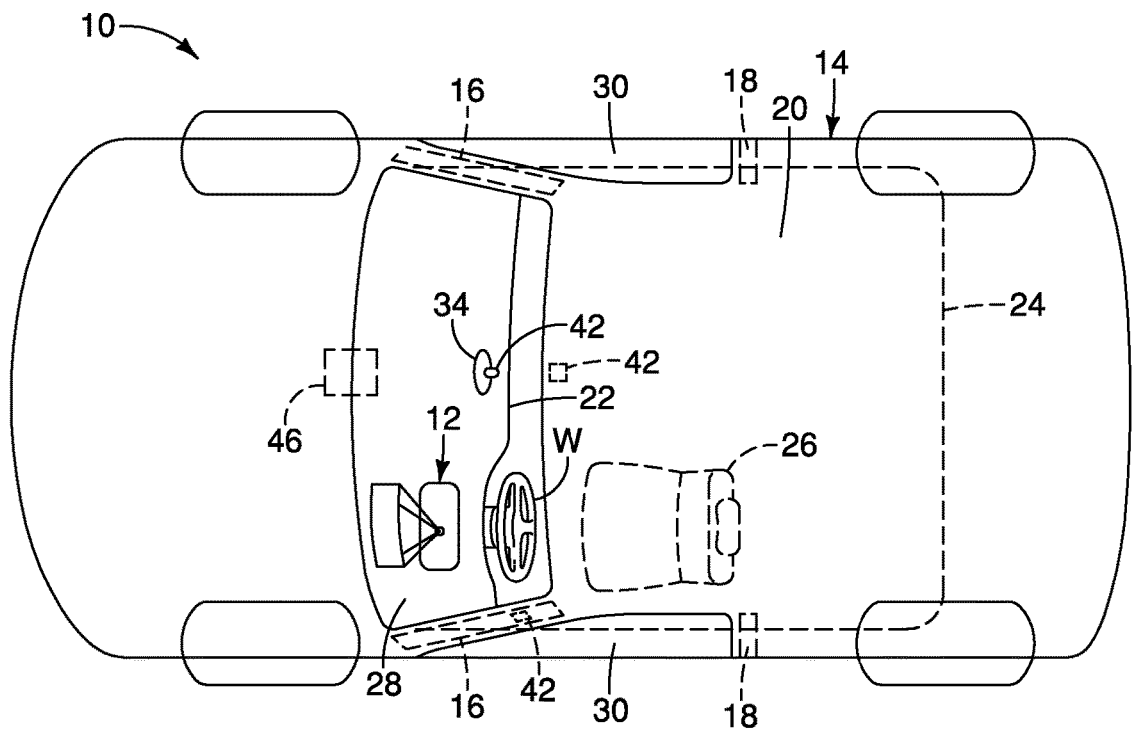
FIG. 1 is a top schematic view of a vehicle that includes a heads-up display system (an HUD system) in accordance with a first embodiment.

Referring initially to FIG. 1, a vehicle 10 having a heads-up display system 12 (hereinafter referred to as the HUD system 12) is illustrated in accordance with a first embodiment.

The vehicle 10 (shown schematically in FIG. 1) includes a vehicle body structure 14 shown schematically in FIG. 1. The vehicle body structure 14 includes, among other features and structures, A-pillars 16, B-pillars 18, a roof structure 20, an instrument panel 22 within, a passenger compartment 24, a front seat 26 (a vehicle operator's seat) within the passenger compartment 24 and a windshield 28.

The roof structure 20 is supported by the A-pillars 16 and the B-pillars 18. The passenger compartment 24 is defined within the vehicle body structure 14 rearward of the windshield 28 and between the A-pillars 16 and the B-pillars 18. A pair of front doors 30 are defined between adjacent pairs of the A-Pillars 16 and the B-pillars 18 in a conventional manner. Since the elements of the vehicle body structure 14 are conventional components and structures, further description is omitted for the sake of brevity.

Figure 2:
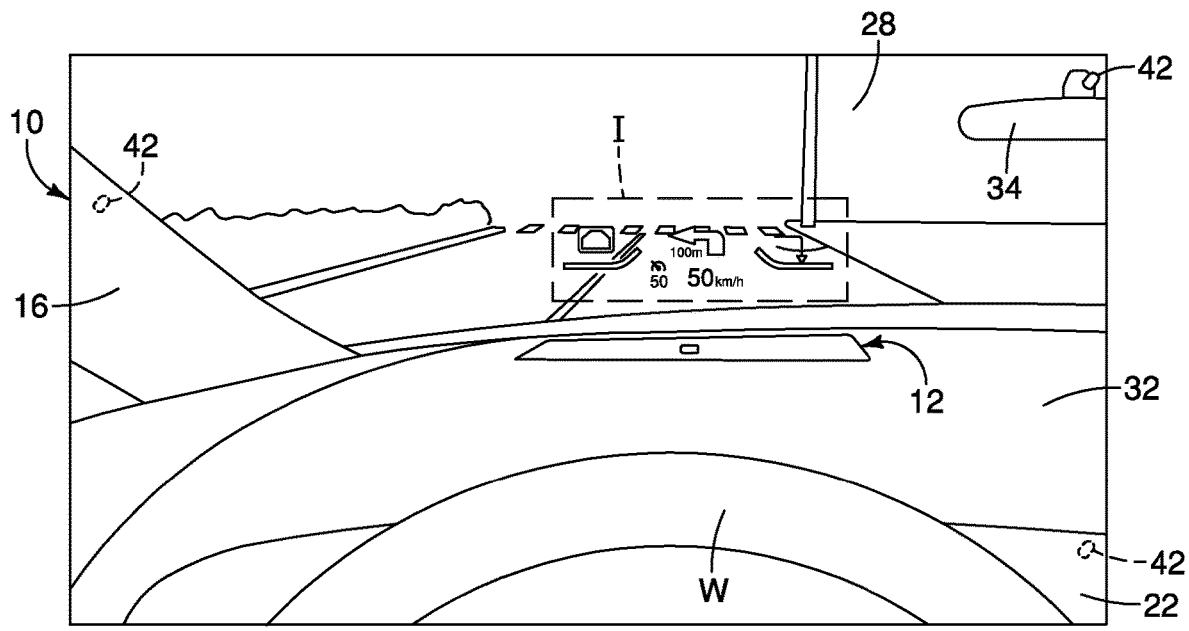
FIG. 2 is a perspective forward view from the point of view of a vehicle operator sitting in a front seat of the vehicle looking through a windshield with an image projected by the HUD system in front of the vehicle operator in accordance with the first embodiment.

As shown in FIG. 2, a portion of the HUD system 12 is installed within the instrument panel 22 such that the portion of the HUD system 12 is exposed along a shelf 32 that covers and upper portion of the instrument panel 22. The shelf 32 extends rearward from a lower portion of the windshield 28 to a rearward edge of the instrument panel 22 forward of a steering wheel W. The windshield 28 can include a rear-view mirror assembly 34.

Figure 3:
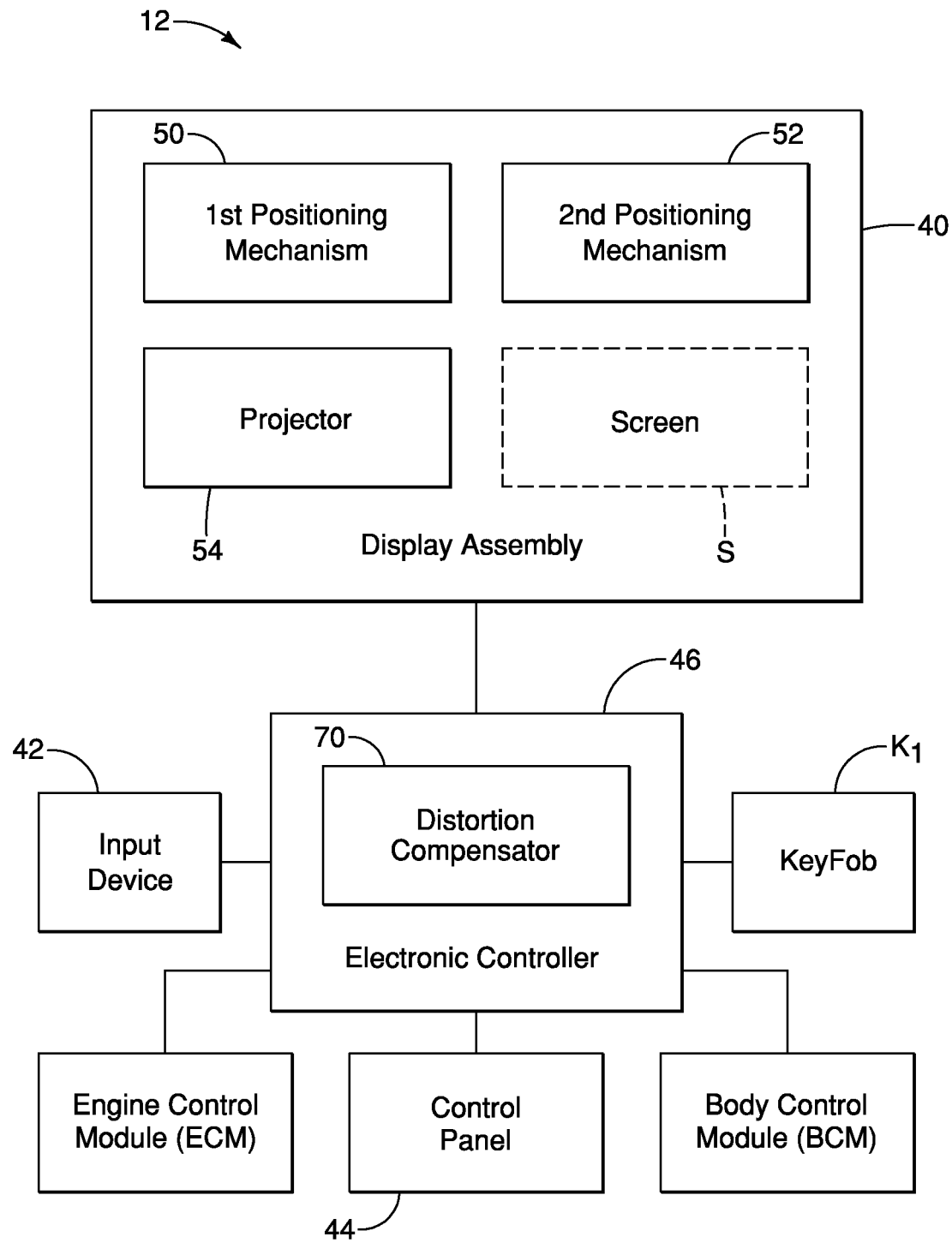
FIG. 3 is a block diagram of the HUD system showing a display assembly having a first positioning mechanism, a second positioning mechanism and a projector (and a screen from the second embodiment), as well as an electronic controller with a distortion compensator, an input device and, a control panel in accordance with the first embodiment.

The HUD system 12, as shown in FIG. 3, includes a display assembly 40, an input device 42, a control panel 44 and an electronic controller 46.

The display assembly 40 is configured to display images I (FIG. 2) of least one of driving related information and vehicle related information such that the images I are visible to a vehicle operator (not shown) sitting in the vehicle operator seat 26 (front seat 26) while looking at or through the windshield 28 of the vehicle 10. The display assembly 40 is further configured to change position of the images I relative to the vehicle operator (and the front seat 26) between any one of a plurality of predetermined areas through $I_6$ relative to the windshield 28. The areas $I_1$ through $I_6$ (also referred to as image positions $I_1$ through $I_6$) are described in greater detail below with specific reference to FIGS. 9-17.

Figure 4:
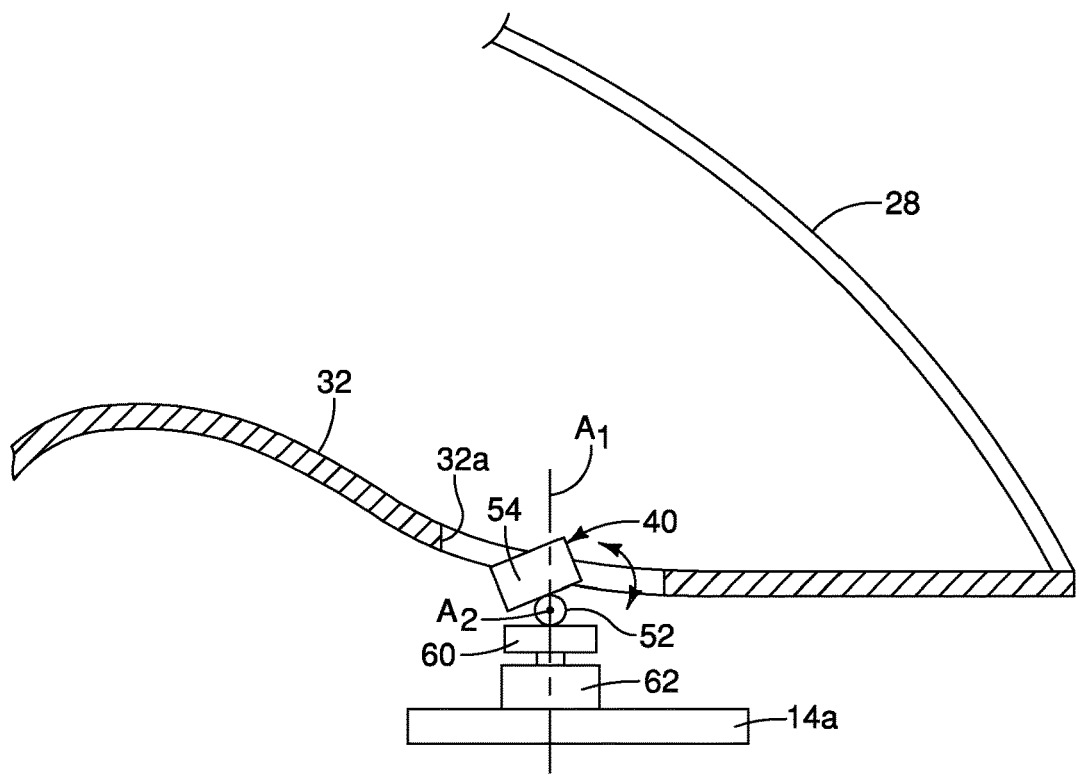
FIG. 4 is a side schematic view of a portion of the passenger compartment, windshield and instrument panel, showing the first positioning mechanism and the second positioning mechanism supporting the projector and positioning the projector to projects image to a lower area of the windshield in accordance with the first embodiment.
Figure 5:
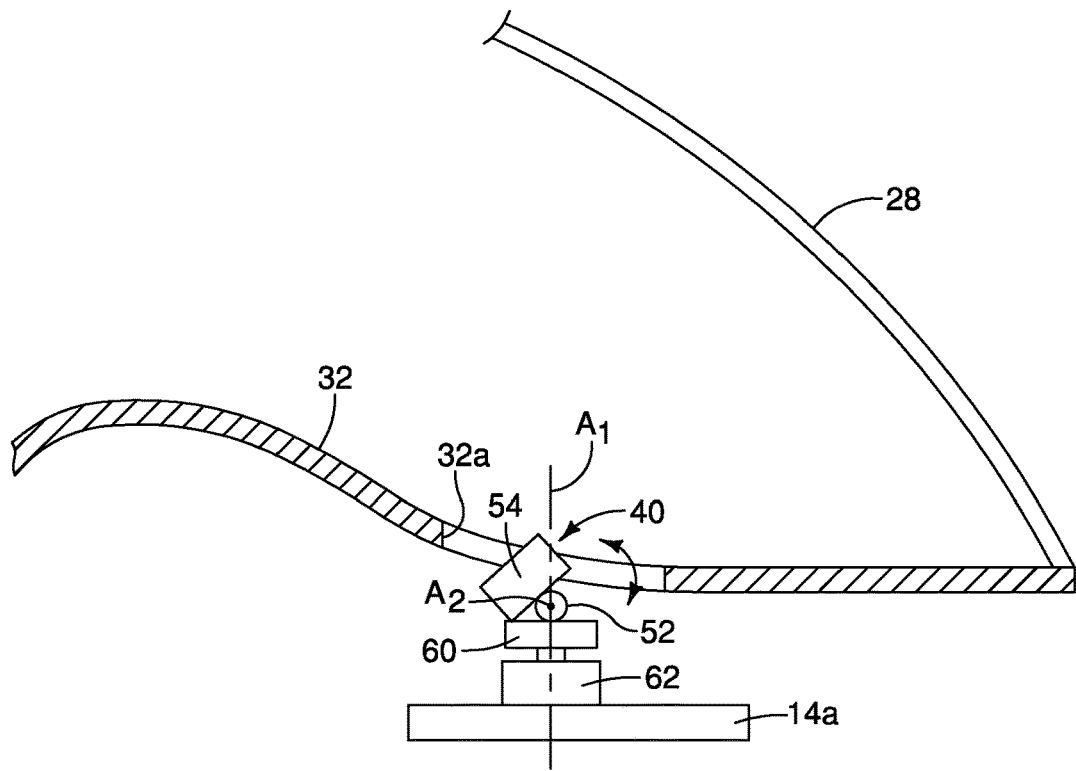
FIG. 5 is another side schematic view of the portion of the passenger compartment depicted in FIG. 4, showing the first positioning mechanism and the second positioning mechanism supporting the projector and positioning the projector to projects image to an upper area of the windshield in accordance with the first embodiment.

As shown schematically in FIGS. 3, 4 and 5, the display assembly 40 includes a first positioning mechanism 50, a second positioning mechanism 52 and a projector 54 (a projection device).

The first positioning mechanism 50 is configured to selectively move the projector 54 in radial directions relative to an upright axis $A_1$. Specifically, in the first embodiment, the first positioning mechanism 50 pivots the projector 54 about the upright axis $A_1$. In the first embodiment, the upright axis $A_1$ is approximately vertically oriented with the vehicle 10 parked on level ground.

As shown in FIGS. 4 and 5, the first positioning mechanism 50 includes a base 60 and a positioning motor 62. The positioning motor 62 is attached to a portion 14*a* of the vehicle body structure 14 such that the base 60 pivots about the upright axis $A_1$ in response to operation of the positioning motor 62, as described further below. The portion 14*a* of the vehicle body structure 14 is a beam or support structure within the instrument panel 22 beneath the shelf 32. The shelf 32 includes an opening 32*a* that receives the projector 54.

The second positioning mechanism 52 is fixedly attached to the base 60 for pivoting movement therewith (movement of the base 60 being effected by the first positioning mechanism 50). The second positioning mechanism 52 is configured to selectively move the projector 54 about a horizontal axis $A_2$, as is also shown in FIGS. 4 and 5. In the first embodiment, the second positioning mechanism 52 is a positioning motor. The projector 54 is fixed to the second positioning mechanism 52 for tilting movement about the second axis $A_2$ effected by the second positioning mechanism 52 and pivoting movement about the first axis $A_1$ by the first positioning mechanism 50.

The positioning motor 62 and the positioning motor that defines the second positioning mechanism 52, can be, for example, stepper motors that are designed to accurately position structures attached thereto, moving the structures in, for example, one-degree increments. It should be understood from the drawings and the description herein that the positioning motor 62 and the positioning motor that defines the second positioning mechanism 52 are selected to suit the geometry of the usage of the projector 54 relative to the surface that the images I are projected to. Since positioning motors (stepper motors) are conventional electro-mechanical devices, further description is omitted for the sake of brevity.

As shown in FIGS. 4 and 5, the second positioning mechanism 52 is configured to selectively move the projector 54 about the horizontal axis $A_2$. In FIG. 4, the projector 54 is tilted or pivoted to a lower projecting orientation such that the images are projected to, for example, any one of the image positions $I_1$, $I_2$ or $I_3$ shown in FIGS. 12, 13 and 14, respectively. In FIG. 5, the projector 54 is tilted or pivoted to a raised projecting orientation such that the images I are projected to, for example, any one of the image positions $I_4$, $I_5$, or $I_6$ shown in FIGS. 15, 16 and 17, respectively.

Figure 6:
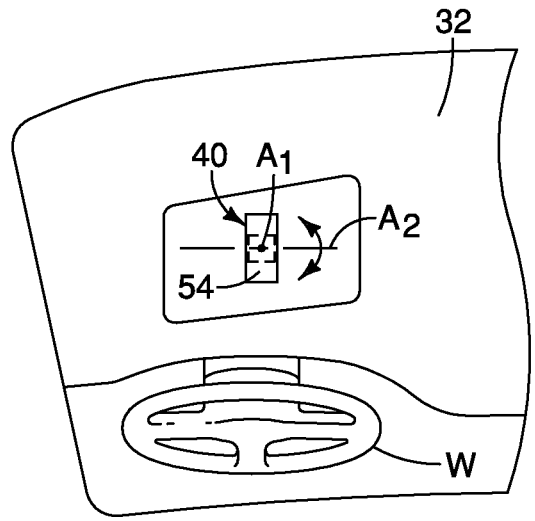
FIG. 6 is a top view of the portion of the passenger compartment depicted in FIGS. 4 and 5, looking downward at the projector with the projector positioned to project an image to an area of the windshield immediately forward of the front seat and steering wheel in accordance with the first embodiment.
Figure 7:
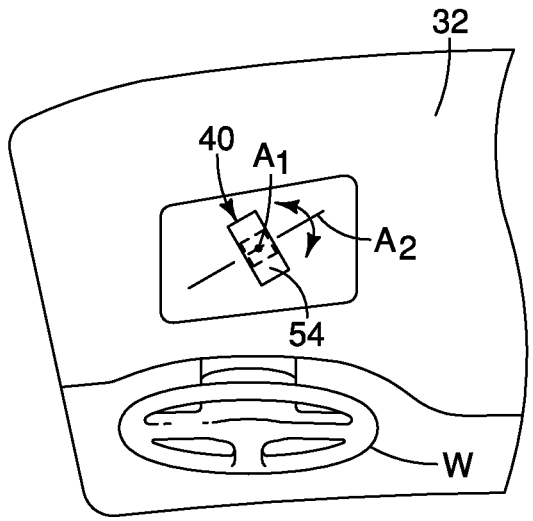
FIG. 7 is another top view of the portion of the passenger compartment depicted in FIGS. 4 and 5, looking downward at the projector with the projector positioned to project an image to an area of the windshield immediately to the left of the front seat and steering wheel in accordance with the first embodiment.
Figure 8:
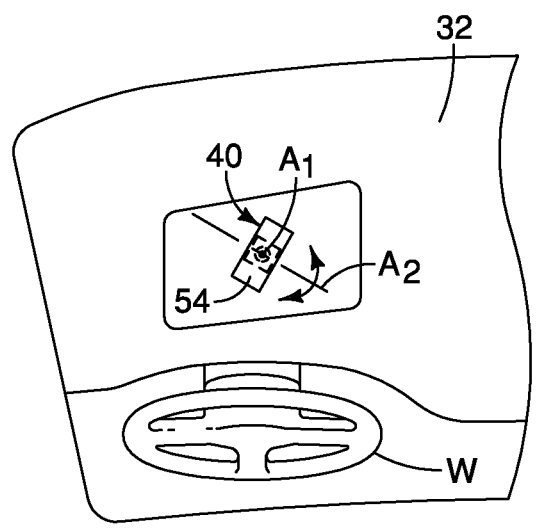
FIG. 8 is yet another top view of the portion of the passenger compartment depicted in FIGS. 4 and 5, looking downward at the projector with the projector positioned to project an image to an area of the windshield immediately to the right of the front seat and steering wheel in accordance with the first embodiment.
Figure 9:
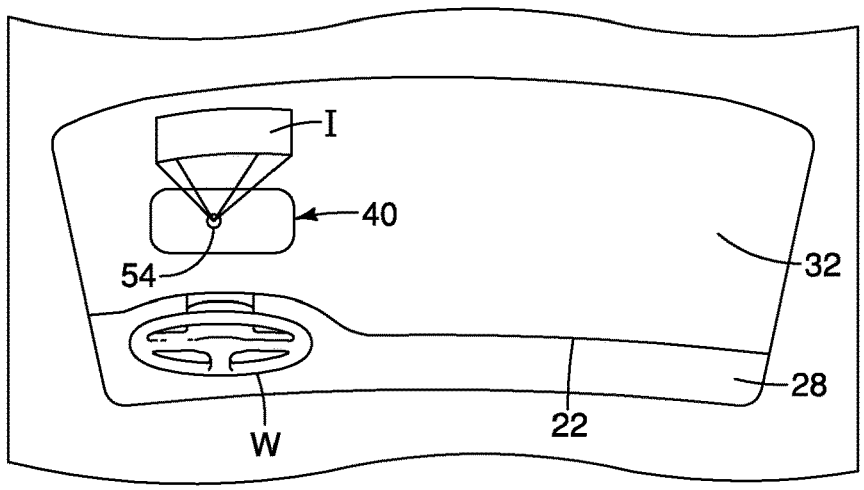
FIG. 9 is another top view of a front area of the passenger compartment depicted in FIGS. 4 and 5, looking downward at a shelf covering the instrument panel, showing the projector projecting an image to the area of the windshield immediately forward of the front seat and steering wheel corresponding to the position of the projector in FIG. 6, in accordance with the first embodiment.
Figure 10:
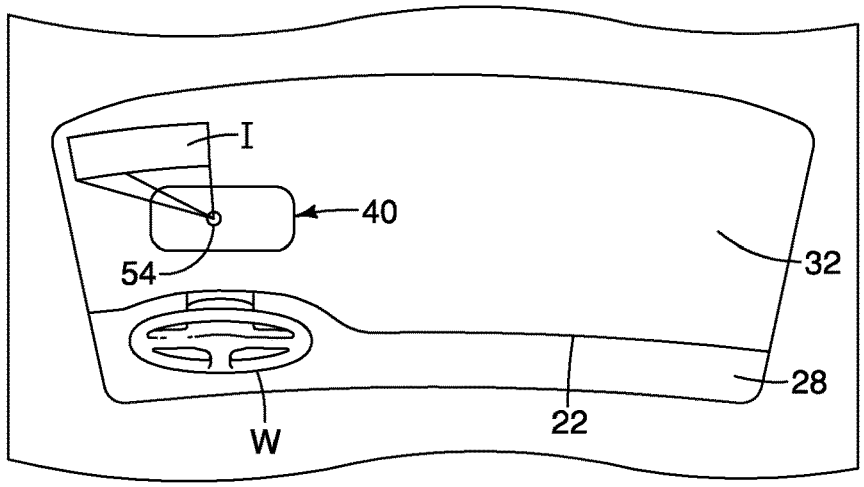
FIG. 10 is another top view of a front area of the passenger compartment similar to FIG. 9, looking downward at a shelf covering the instrument panel, showing the projector projecting an image to the area of the windshield immediately to the left of the front seat and steering wheel corresponding to the position of the projector in FIG. 7, in accordance with the first embodiment.
Figure 11:
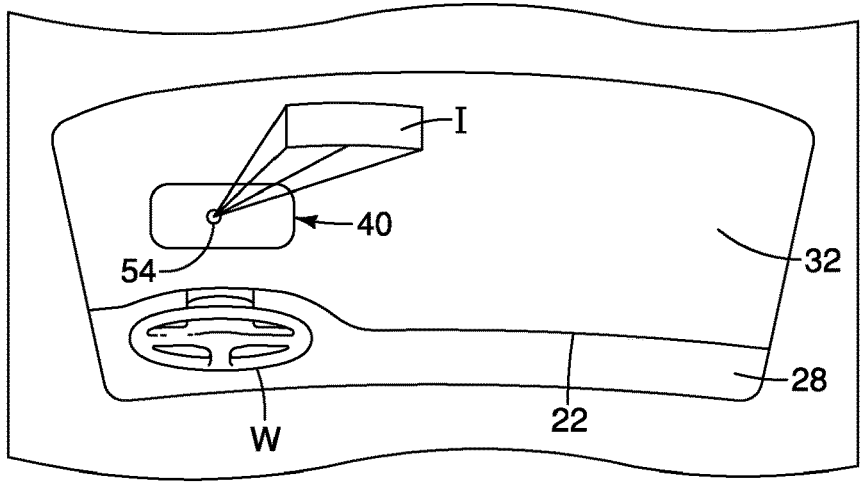
FIG. 11 is another top view of a front area of the passenger compartment similar to FIGS. 9 and 10, looking downward at a shelf covering the instrument panel, showing the projector projecting an image to the area of the windshield immediately to the right of the front seat and steering wheel corresponding to the position of the projector in FIG. 8, in accordance with the first embodiment.
Figure 12:
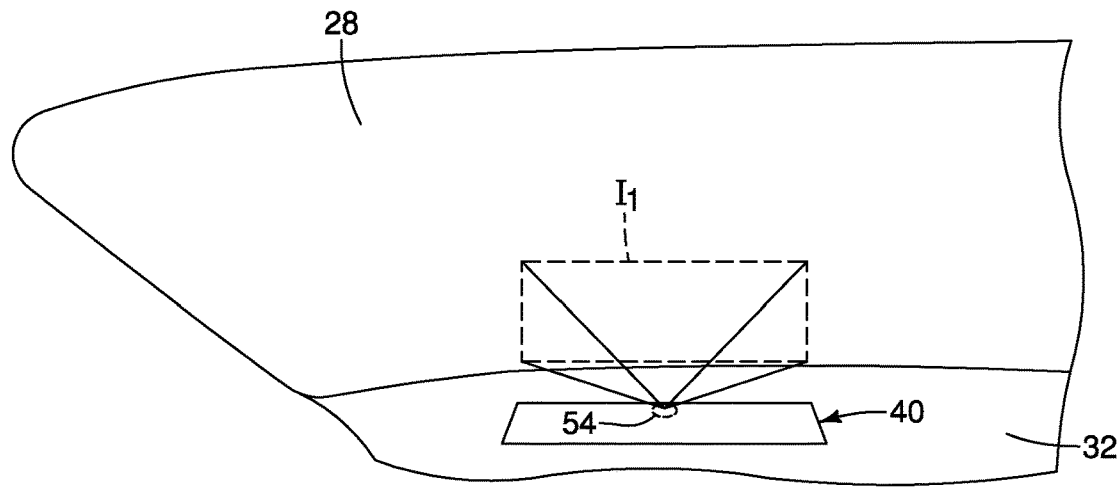
FIG. 12 is a forward view of the instrument panel and the windshield similar to FIG. 2 showing the projector projecting the image to a first image position forward of the front seat and the steering wheel along a lower area of the windshield in accordance with the first embodiment.
Figure 13:
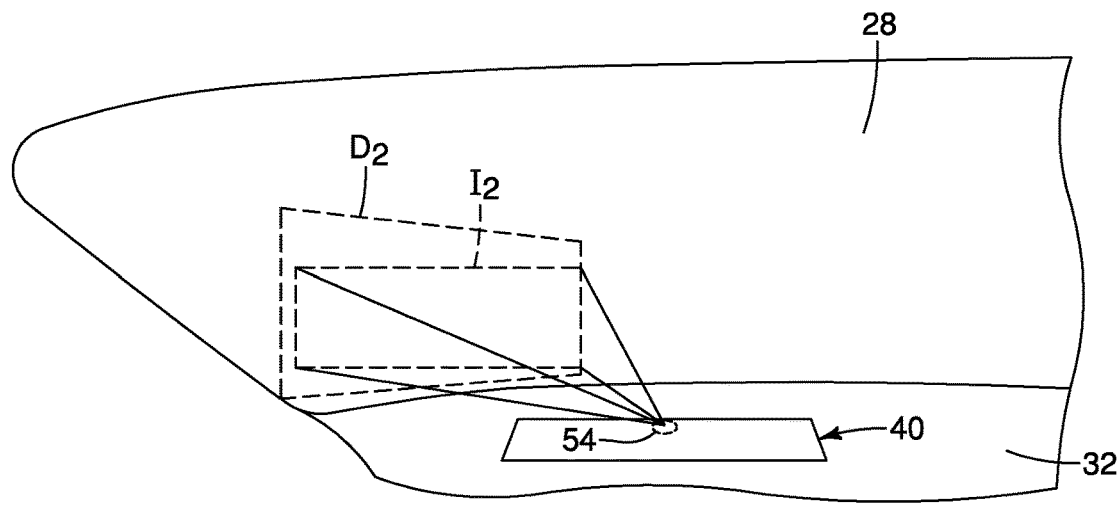
FIG. 13 is another forward view of the instrument panel and the windshield showing the projector projecting the image to a second image position to the left of the front seat and the steering wheel along a lower area of the windshield in accordance with the first embodiment.
Figure 14:
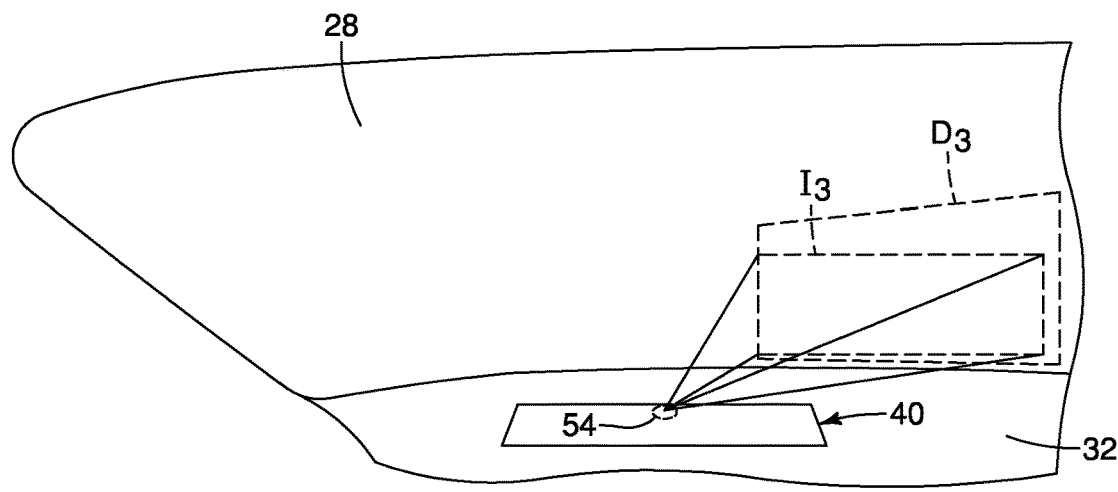
FIG. 14 is another forward view of the instrument panel and the windshield showing the projector projecting the image to a second image position to the right of the front seat and the steering wheel along a lower area of the windshield in accordance with the first embodiment.
Figure 15:
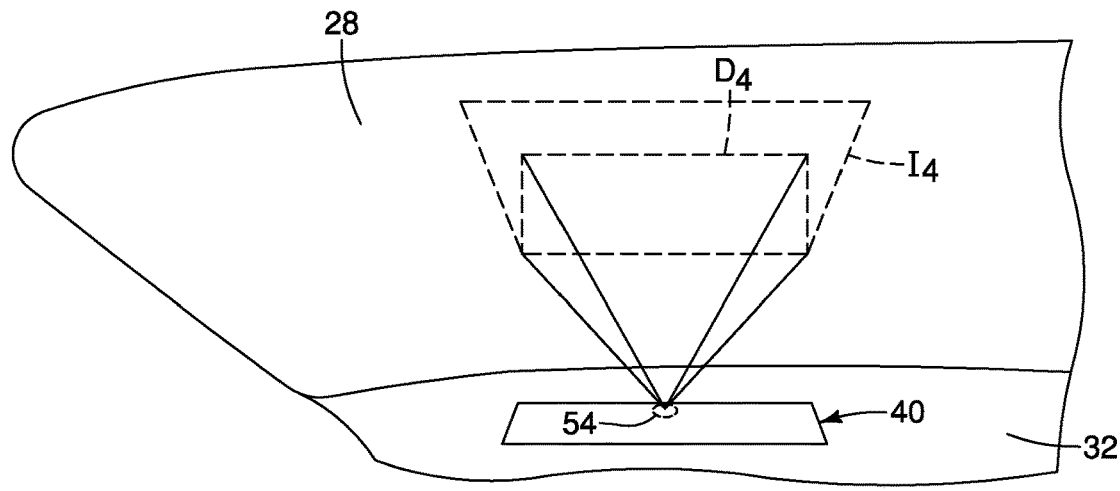
FIG. 15 is a forward view of the instrument panel and the windshield showing the projector projecting the image to a fourth image position forward of the front seat and the steering wheel along an upper area of the windshield in accordance with the first embodiment.
Figure 16:
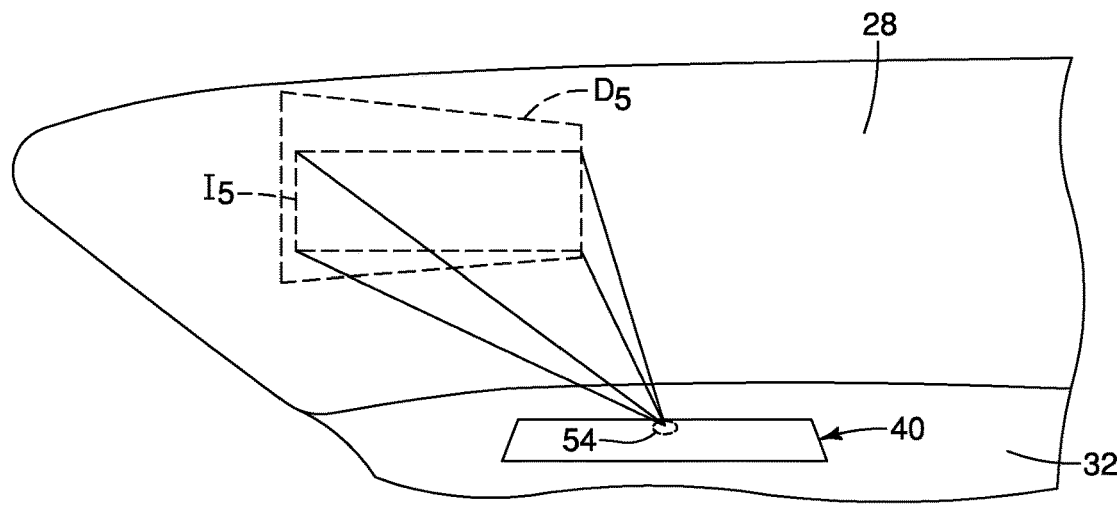
FIG. 16 is another forward view of the instrument panel and the windshield showing the projector projecting the image to a fifth image position to the left of the front seat and the steering wheel along an upper area of the windshield in accordance with the first embodiment.
Figure 17:
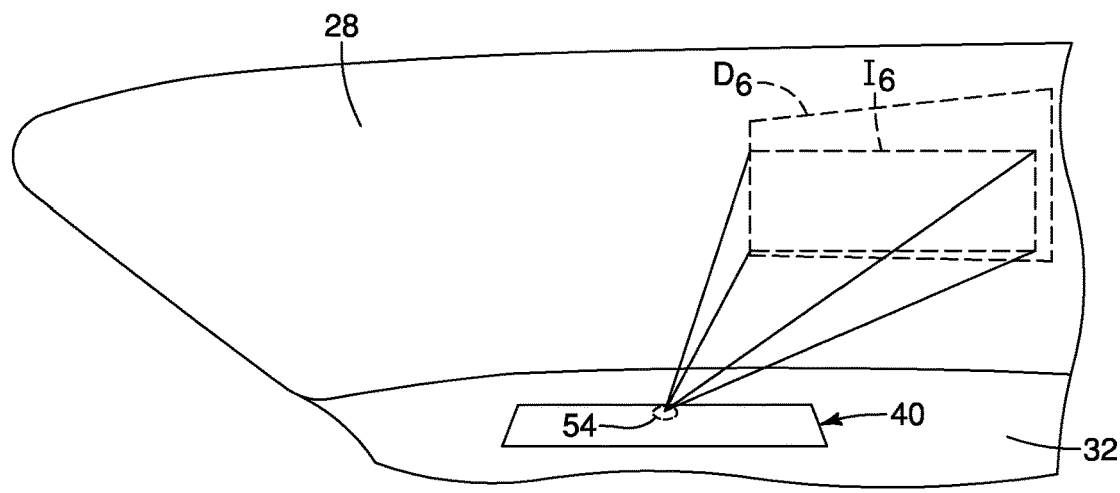
FIG. 17 is another forward view of the instrument panel and the windshield showing the projector projecting the image to a sixth image position to the right of the front seat and the steering wheel along an upper area of the windshield in accordance with the first embodiment.

As shown in FIGS. 6, 7 and 8, the first positioning mechanism 50 is operated to pivot the projector 54 about the vertical axis $A_1$ to a plurality of positions or orientations such that the images I are projected to, for example, any one of the image positions $I_1$, $I_2$ or $I_3$ shown in FIGS. 12, 13 and 14 (with the projector 54 tilted downward by the second positioning mechanism 52), and the image positions $I_4$, $I_5$ or $I_6$ shown in FIGS. 15, 16 and 17, respectively (with the projector 54 tilted upward by the second positioning mechanism 52).

As mentioned above, the projector 54 (the projector device of the first embodiment) is configured to project the images I directly onto the windshield 28.

The image positions $I_1$ through $I_6$ are projected by the projector 54. In the image position $I_1$ (a first position shown in FIG. 12) the aspect ratio is defined by the overall width vs the overall height of the image I. The electronic controller 46 is preprogrammed to provide the image I with a predetermined aspect ratio such that in the image position $I_1$ (the first position) the image I appears to be rectangular as viewed by the vehicle operator seated in the front seat 26. Due to the position of the projector 54 and the angle of inclination of the windshield 28, the upper edge of the image I can be a first distance away from the projector 54 while the lower edge of the image I can be a second distance away from the projector 54. Certain geometric relationships defined between the projector 54 and the windshield 26 as a result of these differing distances. Hence, with the image I being projected to the image position $I_1$ (the first position) the image I is processed by the electronic controller 46 (in conjunction with the optical characteristics of the projector 54) using predetermined presets such that the image I is rectangular at the image position $I_1$.

When the display assembly 40 is operated to move the projector 54 to project the image I to the image position $I_2$ as shown in FIG. 13, the distances between the projector 54 and various portions of the image position 12 on the windshield 28 change relative to the image position $I_1$. Specifically, a leftmost portion of the in I is further away from the projector 54 than a rightmost portion of the image I at the image position $I_2$ as shown in FIG. 13. These differences in distance cause the image I to be distorted. The resulting projected image (without any distortion compensation) would be distorted and stretch as indicated by the distorted image $D_2$, shown in FIG. 13.

Similarly, when the display assembly 40 is operated to move the projector 54 to project the image I to the image position 13 as shown in FIG. 14, the resulting projected image (without any distortion compensation) would be distorted and stretch as indicated by the distorted image $D_3$, shown in FIG. 14.

Further, when the display assembly 40 is operated to move the projector 54 to project the image I to any one of the image positions $I_4$, $I_5$ and $I_6$ as shown in FIGS. 15, 16 and 17, the resulting projected images (without any distortion compensation) would be distorted and stretch as indicated by the distorted images $D_4$, $D_5$ and $D_6$ shown in FIGS. 15, 16 and 17, respectively.

The electronic controller 46 is provided with distortion compensation in a preprogrammed portion of the processing capabilities of electronic controller 46 hereinafter referred to as a distortion compensator 70. The distortion compensator 70 is programmed, constructed or otherwise configured to process the data and information that defines the image I, and alter the image projected by the projector 54 in order to compensate for the distortion such that at each of the image positions $I_2$, $I_3$, $I_4$, $I_5$ and $I_6$, the image I appears as a rectangle with the same aspect ratio as the image position $I_1$.

The distortion compensator 70 takes into account at least the following properties and relationships in determining distortion compensation of the projected image I at each of the image positions $I_3$, $I_3$, $I_4$, $I_5$ and $I_6$: the optical properties of the projector 54, the relative angles defined between the projector 54 and the specific boundaries of each of the image positions $I_1$, $I_2$, $I_3$, $I_4$, $I_5$ and $I_6$, the predicted boundaries of the distorted images $D_2$, $D_3$ $D_4$, $D_5$ and $D_6$, the angle of inclination of the windshield 28 relative to vertical and/or relative to the projector 54 and the geometric relationship between an optical axis of the projector 54 and the surface of the windshield 28. Hence, when the projector 54 is repositioned, the electronic controller 46 and the distortion compensator 70 processes the data that defines the image I, and, provides the projector 54 with compensated image generating instructions such that compensated images are projected to each of the image positions $I_1$, $I_2$, $I_3$, $I_4$, $I_5$ and $I_6$.

The data or information used to define the image projected by the projector 54 can include wide ranging sets of content. For example, the content projected in the image I can include driving related information and/or vehicle related information. The driving related information can include navigation information (GPS), blind spot warnings, communications such as incoming text or incoming phone call warnings and forward emergency braking information, and the like. The vehicle related information can include vehicle speed, engine tachometer, engine temperature, oil pressure, audio system information, tire pressures, fuel level, and the like. The actual information presented in the image if can be selected by the vehicle operator using the control panel 44, which is described further below.

The input device 42 is installed to the vehicle body structure 14 within the passenger compartment 24, as shown in FIGS. 1 and 2. The input device 42 is configured to receive positioning information of the vehicle operator. Specifically, the input device 42 is a device that identifies the location of, for example, a facial feature, or facial features of the vehicle operator and detects movement of the facial feature, or facial features. For example, the input device 42 (with processing power of the electronic controller 46) can identify the vehicle operator's nose or eyes and follow movement thereof. The movement detected by the input device 42 is used by the electronic controller 46 in determining whether or not the image I projected by the projector 54 should be moved in order to keep the image I of the heads-up display in a location readily visible to the vehicle operator. Hence, the input device 42 is a position sensing device that is one selected from a group of position sensing devices consisting of: a camera installed within the passenger compartment configured to detect position, orientation and movement of the head of the vehicle operator; an infrared sensor configured to detect position, orientation and movement of the head of the vehicle operator; and, an ultrasonic sensor configured to detect position, orientation and movement of the head of the vehicle operator.

The input device 42 (the position sensing device) is installed to a portion of the rear-view mirror assembly 34, as shown in FIGS. 1 and 2 in solid lines. Alternatively, as shown in FIGS. 1 and 2 in phantom lines, the input device 42 is installed to one or more of the A-pillars 16, the roof structure 20 adjacent to the windshield 28 or the instrument panel 22 within the passenger compartment 24 of the vehicle 10.

The control panel 44 (another input device) is connected to the electronic controller 46 and is configured for manual input of the selection of specific bits of information the vehicle operator chooses to be displayed in the images I. More specifically, the control panel 44 has, for example, a touch screen display that displays various menus with lists of specific vehicle related information and driving related information. The vehicle operator can and manually select which information, or predetermined sets of information are to be displayed. Further, the control panel 44 is configured to display a menu such that the vehicle operator can select a fixed position where the image I is to be displayed or can select automatic positioning based on information from the input device 42 or a preset operation saved along with identification of a specific keyfob $K_1$ or mobile device. Further, the vehicle operator can choose or enter a setting that limits the number of the image positions the image I is to be moved between. For example, the vehicle operator can limit movement of the heads-up display image I to only the image positions $I_1$, $I_2$ and $I_3$, or to only the image positions $I_4$, $I_5$ and $I_6$.

The electronic controller 46 is installed within the vehicle 10 and is electrically connected to the HUD system 12 and various vehicle components. Specifically, the electronic controller 46 is electrically connected to the display assembly 40 (the first positioning mechanism 50, the second positioning mechanism 52 and the projector 54 of the projection device 40), the input device 42 and the control panel 44. The electronic controller 46 is further connected to vehicle 10 components such as the ECM (engine, or electronic control module) and the BCM (body control module). The electronic controller 46 receives the driving related information and the vehicle related information from the ECM and BCM of the vehicle 10. Since ECM and BCM components are conventional automotive components, further description is omitted for the sake of brevity. The electronic controller 46 is further in electronic communication with the keyfob $K_1$ and/or with mobile devices with apps or wireless communication capability in a conventional manner.

The electronic controller 46 is configured to operate the display assembly 40 to selectively move the projector 54, and, hence the image I projected by the projector 54, between the plurality of predetermined areas of the windshield 28 including the first, second, third, fourth, fifth and sixth image positions $I_1$, $I_2$, $I_3$, $I_4$, $I_5$ and $I_6$.

The electronic controller 46 is further configured to compensate for distortion of the image I and maintain the predetermined aspect ratio of the image I in response to the image I being moved away from the first image position $I_1$ toward or to any of the other image positions $I_2$, $I_3$, $I_4$, $I_5$, and $I_6$. Specifically, the electronic controller 46 compensates for distortion of the image I in order to maintain a predetermined aspect ratio of the image I as viewed by the vehicle operator when the image I is moved to and between each, of image positions $I_1$, $I_2$, $I_3$, $I_4$, $I_5$ and $I_6$, in particular when the image I is projected to a position that is angularly offset from a plane normal to an optical axis of the projector 54 of the display assembly 40.

The electronic controller 46 further processes positioning data from the input device 42 (the position sensing device) and automatically repositions the image I to an appropriate location in order to make the information in the image I available to the vehicle operator. In other words, the electronic controller 46 is configured to determine which of the image positions $I_1$, $I_2$, $I_3$, $I_4$, $I_5$ and $I_6$ of the windshield 28 the image should be moved to in response to the positioning information of the vehicle operator received by the input device 42 (the position sensing device).

The electronic controller 46 also receives and processes selections entered by the vehicle operator using the control panel 44 and enters those selections.

On a more basic level, the electronic controller 46 is configured to operate the first pivoting mechanism 50 and the second pivoting mechanism 52 to selectively move and aim the projector 54 such that the projector 54 projects the imager to a determined one of the plurality of predetermined areas on the windshield 28 (the image positions $I_1$, $I_2$, $I_3$, $I_4$, $I_5$ and $I_6$).

The keyfob $K_1$ is in communication with the electronic controller 46 and can be linked or tied to user information related to the vehicle driver associated with the keyfob $K_1$. The electronic controller 46 stores the user information correlated to the keyfob $K_1$. The user information can include user preferences previously entered via the control panel 44 such that in response to detection of the keyfob $K_1$, the electronic controller 46 uses the stored user information correlated to the keyfob $K_1$, for initializing operation of the display assembly 40.

The electronic controller 46 preferably includes a microcomputer with a HUD system control program that controls the HUD system 12, as discussed herein. The electronic controller 46 can also include other conventional components such, as an input interface circuit, an output interface circuit, and storage devices such as a ROM (Read Only Memory) device and a RAM (Random Access Memory) device. The microcomputer of the electronic controller 46 is programmed to receive data, information and signals from the input device 42, the control panel 44 and position feedback from each of the first positioning mechanism 50 and second positioning mechanism 52 in order to position the projector 54 accordingly. Hence, the electronic controller 46 control the HUD system 12. The memory circuit includes non-transitory memory that stores communication protocols, and operational programs associated with the operation of the HUD system 12. The memory circuit includes in the non-transitory memory control programs such as ones for processing data from each of the input device 42, the control panel 44 and operation of the display assembly 40. The electronic controller 46 is further configured to detect the presence of the keyfob $K_1$ (and mobile devices such as cell phones) and correlated data associated therewith. The internal RAM of the electronic controller 46 stores statuses of operational flags and various control data. The internal ROM of the electronic controller 46 stores the HUD system 12 operating commands for conducting the various operations described herein. The electronic controller 46 is capable of selectively controlling any of the components of the HUD system 12 in accordance with the stored control program, it will be apparent to those skilled in the art from this disclosure that the precise structure and algorithms for the electronic controller 46 can be any combination of hardware and software that will carry out the functions of the present invention. The memory circuit can also be a device such as any computer storage device or any computer readable medium with the sole exception of a transitory, propagating signal. For example, the memory device can be nonvolatile memory and volatile memory, and can includes a ROM (Read Only Memory) device, a RAM (Random Access Memory) device, a hard disk, a flash drive, etc.

Figure 18:
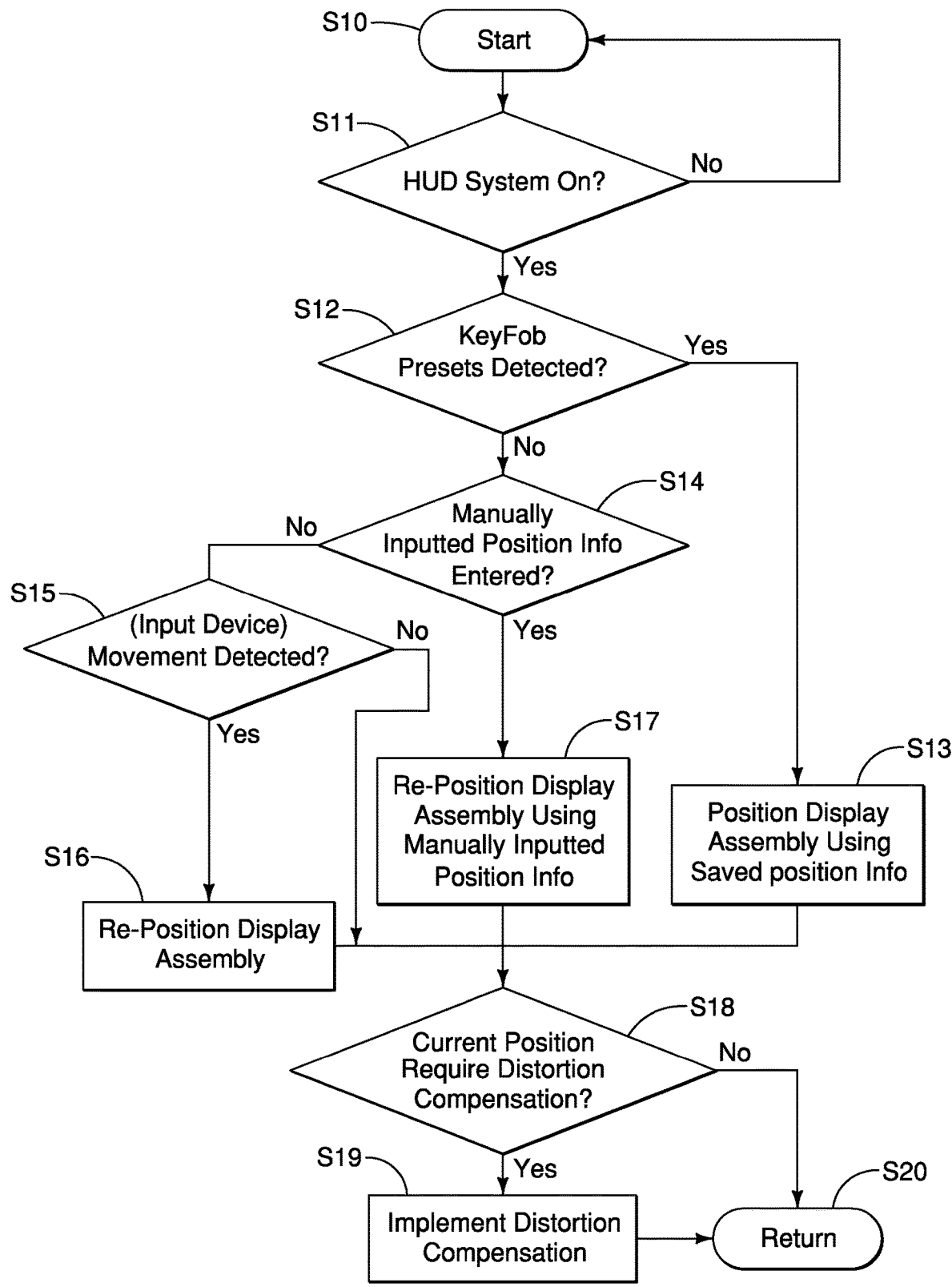
FIG. 18 is a flowchart showing one example of logic used by the electronic controller in accordance with the first embodiment.

A description of a flowchart showing one example of logic conducted by the electronic controller 46 is now provided with specific reference to FIG. 18.

At step S10, the electronic controller 46 is initialized after being turned on with, for example the engine of the vehicle 10 being turned on. At step S11, the electronic controller 46 determines whether or not the HUD system 12 has been turned on. For example, previously, the vehicle operator may have turned off the FEUD system 12 via a selection or input using the control panel 44. If the HUD system 12 has been previously turned off, operation returns to step S10. If the HUD system 12 has been turned on via the control panel 44, operation moves to step S12.

At step S12, the electronic controller 46 determines whether or not a keyfob has been detected and whether or not previously saved settings or presets have been detected in memory. If yes, then the presents are retrieved from memory and operation moves to step S13 there the projector 54 is moved to the preset position and the display assembly 40 operated in accordance with the settings saved in the presets associated with the keyfob (or mobile device). After step S13, operation moves to step S18, described further below.

Returning to step S12, if no keyfob presets are present (or the presets have been implemented and are being used), operation moves to step S14. As step S14, the electronic controller 46 determines whether or not the control panel 44 has been used to input positioning instructions, such as instructions to position the projector 54 in a fixed orientation such that the image I remains in a image position or location without movement thereof. At step S14, if yes, operation moves to step S17. If no, operation moves to step S15.

At step S15, the electronic controller 46 monitors signals received from the input device 42 which includes a position detecting sensor that senses movement of the face, or eyes of the vehicle operator. The electronic controller 46 determines whether or not the vehicle operator has moved requiring a re-positioning of the image I to one of the image positions $I_1$, $I_2$, $I_3$, $I_4$, $I_5$ and $I_6$ or a location somewhere therebetween. If movement is detected and re-positioning is required, operation moves to step S16. If not, operation moves to step S18.

Next at step S16, the electronic controller 46 operates one or both of the first positioning mechanism 50 and the second positioning mechanism 52 of the display assembly 40 to move the projector 54 to the determined position as determined by the electronic controller 46. Thereafter, operation moves to step S18.

Returning to step S17, the electronic controller 46 re-positions the projector 54 using the manually inputted position information as determined in step S14. Thereafter, operation moves to step S18.

At step S18, the electronic controller 46 determines whether a change or changes in the positioning of the projector 46 (made move the position of the projected image I) is such that distortion compensation is necessary in order to maintain the desired aspect ration of the image I. If distortion compensation is necessary, at step S19 the electronic controller 46 provides image compensation to the projector 54 such that the projector 54 projects an image with the desired aspect ratio at the current image position. Thereafter, operation returns at step S20 to step S10 for the repeated iterations of the logic.

In the first embodiment shown in FIGS. 1-18, the display assembly 40 of the HUD system 12 is installed along the shelf 32 above the instrument panel 22, but, spaced apart from the windshield 28 by a distance sufficient to allow projection of the heads-up display image I to any of the image positions $I_1, I_2, I_3, I_4, I_5$ and $I_6$. However, it should be understood from the drawings and the description herein that the display assembly 40 can be made in a very compact package and installed to any of a variety of locations within the passenger compartment 24. For example, the display assembly 40 can be installed to any one of the roof structure 20, one of the A-pillars 16, or one of the B-pillars 18 in areas similar to the alternative locations shown in FIGS. 1 and 2 of the input device 42. With the distortion compensator 70 of the electronic controller 46, the desired aspect ratio can be established electronically.

Second Embodiment

Referring now to FIGS. 19-24, a display assembly 140 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 19:
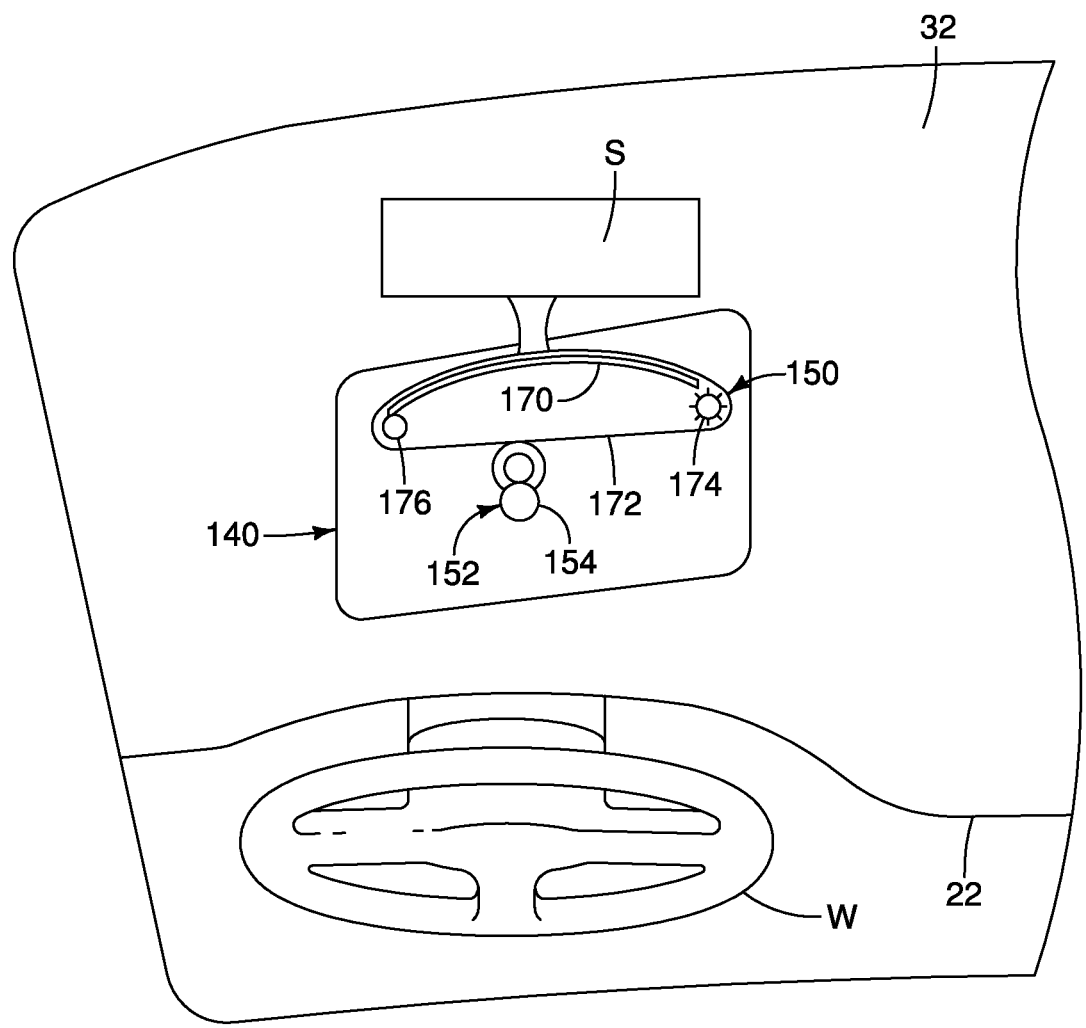
FIG. 19 is a top schematic view of a front area of the passenger compartment looking downward at a shelf covering the instrument panel, showing details of an HUD system that includes a first positioning mechanism, a second positioning mechanism, a projector and a screen with the projector projecting an image to the screen in accordance with a second embodiment.
Figure 20:
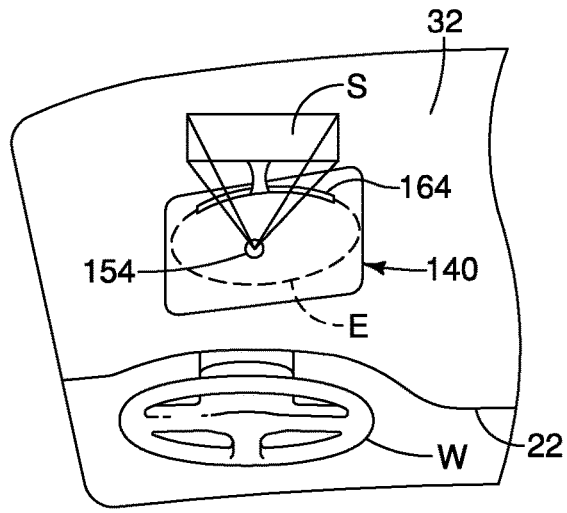
FIG. 20 is another top view of the front area of the passenger compartment showing the screen in a centered position relative to a front seat and the steering wheel in accordance with the second embodiment.
Figure 21:
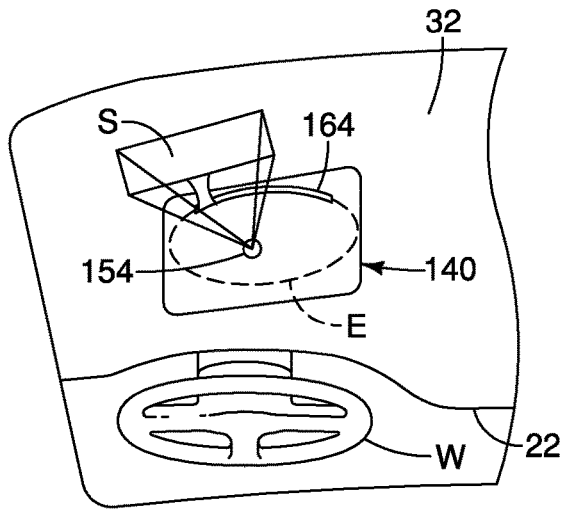
FIG. 21 is another top view of the front area of the passenger compartment showing the screen moved to the left of the centered position relative to a front seat and the steering wheel in accordance with the second embodiment.
Figure 22:
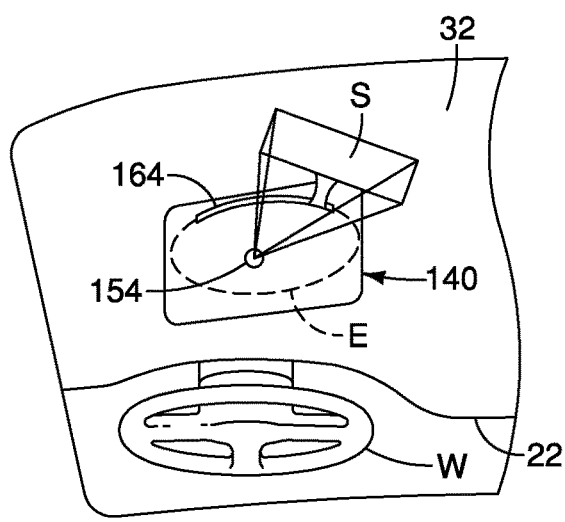
FIG. 22 is another top view of the front area of the passenger compartment showing the screen moved to the right of the centered position relative to a front seat and the steering wheel in accordance with the second embodiment.
Figure 23:
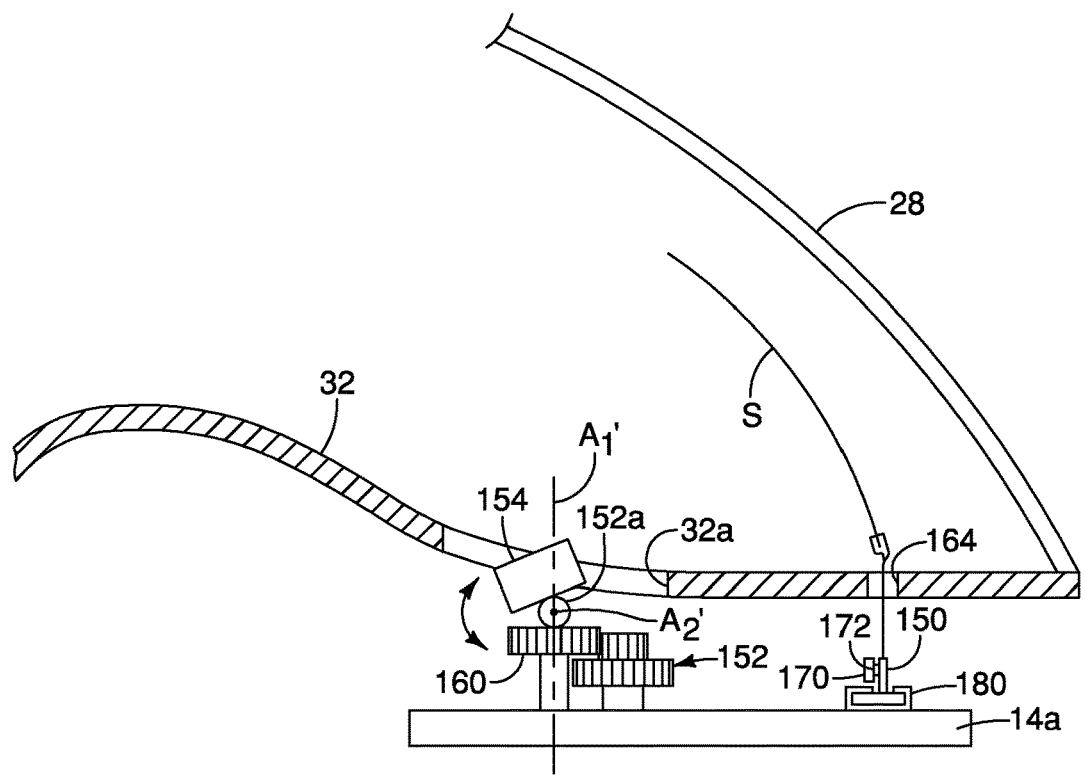
FIG. 23 is a side schematic view of a portion of the passenger compartment, windshield and instrument panel, showing the first positioning mechanism and the second positioning mechanism supporting the projector and the screen with the projector positioned to project an image to a lower area of the screen in accordance with the second embodiment.
Figure 24:
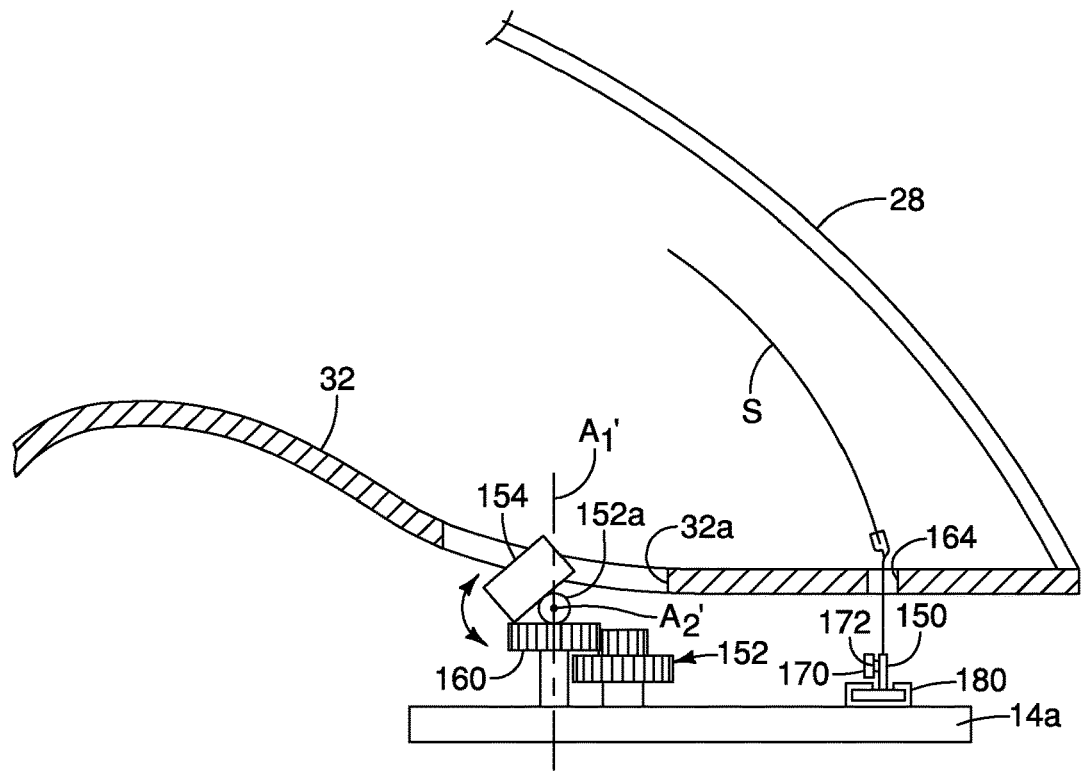
FIG. 24 is a side schematic view of a portion of the passenger compartment, windshield and instrument panel, showing the first positioning mechanism and the second positioning mechanism supporting the projector and the screen with the projector positioned to project an image to an upper area of the screen in accordance with the second embodiment.

The display assembly 140 is installed to the instrument panel 22 along the shelf 32, as shown in FIG. 19. The display assembly 140 operates in a manner similar to that of the display assembly 40 of the first embodiment. The display assembly 140 includes a first positioning mechanism 150, a second positioning mechanism 152, a projector 154 (a projection device) and a screen S, as shown in FIGS. 19, 23 and 24. As shown in FIGS. 20, 21 and 22, the first positioning mechanism 150 the screen is moved along an elliptical path (or oval path) by the first positioning mechanism 150.

As shown in FIG. 19, the first positioning mechanism 150 includes an arcuate shaped guide plate 170, a belt 172, a motor-powered gear 174 and a guide roller 176. The guide plate 170 is fixed in place and guides movement of the belt 172 along the elliptical path E defined in part by the shape of the arcuate shaped guide plate 170. A base of the screen S is fixed to the belt 172 such that movement of the belt 172 changes the position of the screen S relative to axis that mathematically define the elliptical path B. The elliptical path E is shown in FIGS. 20, 21 and 22. A base portion of the screen S moves along a track 180 in order to maintain the screen S in it upright orientation and further guide movement of the screen S.

The shelf 32 includes the opening 32a that accommodates the projector 154 and an arcuate opening or slot 164 to accommodate the screen S and the screen S movement along the elliptical path E.

The second positioning mechanism 152 includes a motor powered gear that causes a base plate 160 to pivot about the vertical axis $A_1'$ such that the electronic controller 46 can operate both the motor-powered gear 174 and the motor powered gear of the second positioning mechanism 152 thereby causing the projector 154 and the screen S to move synchronously. A supplemental motor 152a is connected between the base plate 160 and the projector 154 such that the projector 154 can also be pivoted or tilted about the second axis $A_2'$.

In the second embodiment, the electronic controller 46 controls movement and positioning of the screen S and the projector 154 in a manner consistent with that described above with respect to the first embodiment. The image I need not completely fill the screen S. Therefore, the projector 154 can project the image I to a lower portion of the screen to place the image I in any of the image positions $I_1, I_2$ and $I_3$ with the projector 154 tilted to the orientation shown in FIG. 23. The projector 154 can project the image to an upper portion of the screen to place the image I in any of the image positions $I_4, I_5$ and $I_6$ with the projector 154 tilted to the orientation shown in FIG. 24.

Since the projector 154 is pivoted about a fixed axis $A_1'$ by the electronic controller 46 and the screen S is moved by the electronic controller 46 along the elliptical path F, the distance between the screen S and the projector 154 changes when the electronic controller 46 causes them to be repositioned. Hence, the description in the first embodiment of the distortion compensator 70 also applies to the second embodiment.

Third Embodiment

Referring now to FIGS. 25-30, a display assembly 240 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (') or a double prime (").

Figure 25:
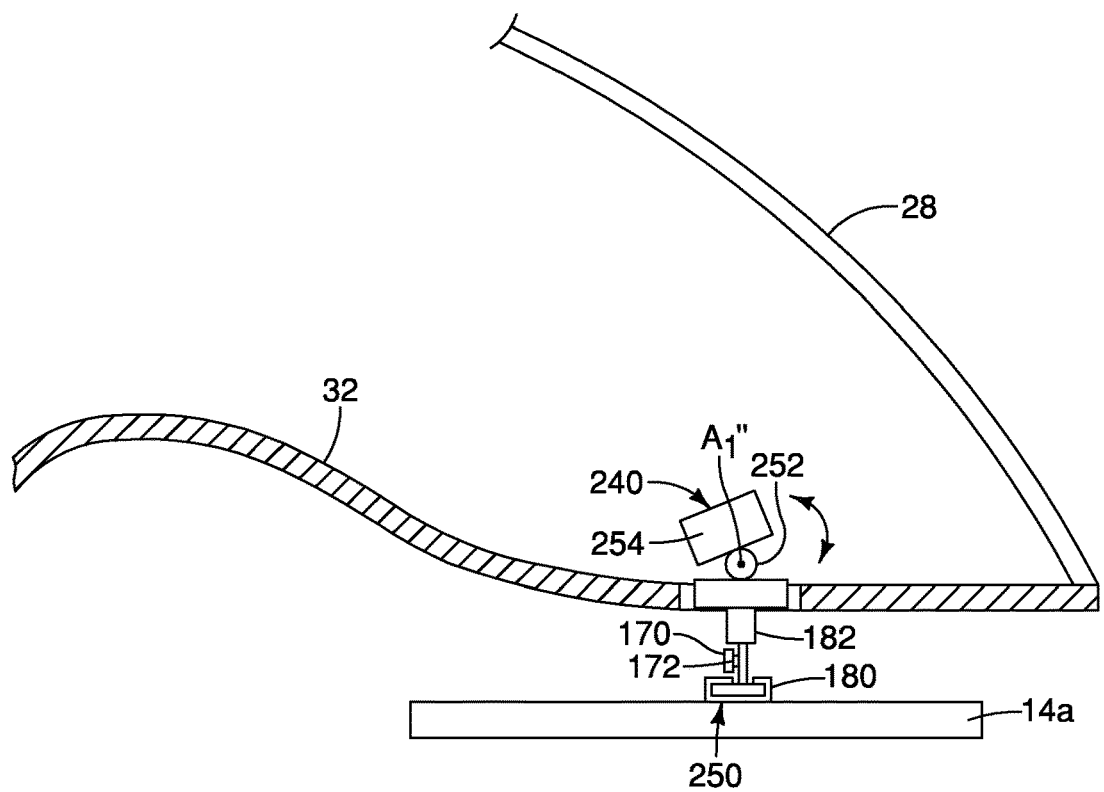
FIG. 25 is a side schematic view of a portion of the passenger compartment, windshield and instrument panel, showing a first positioning mechanism and a second positioning mechanism supporting a projector with the projector positioned to project an image to a lower area of the windshield in accordance with a third embodiment.
Figure 26:
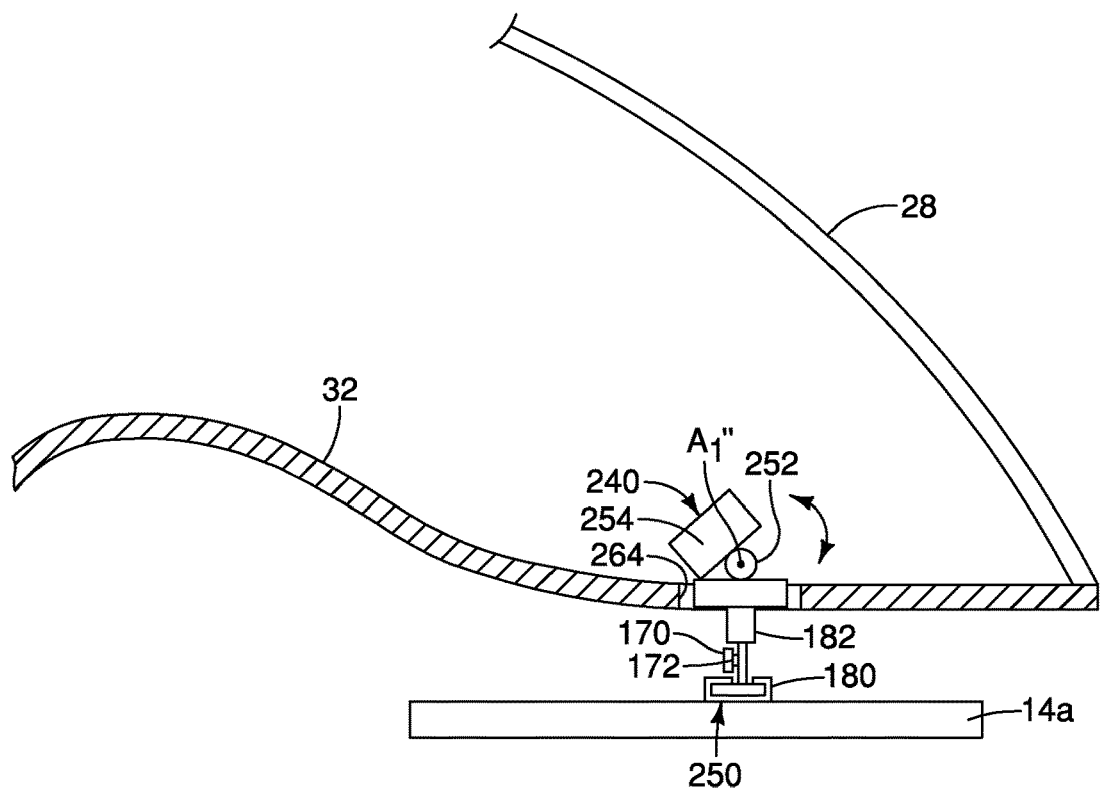
FIG. 26 is a side schematic view of a portion of the passenger compartment, windshield and instrument panel, showing the first positioning mechanism and the second positioning mechanism supporting the projector with the projector positioned to project an image to an upper area of the windshield in accordance with the third embodiment.
Figure 27:
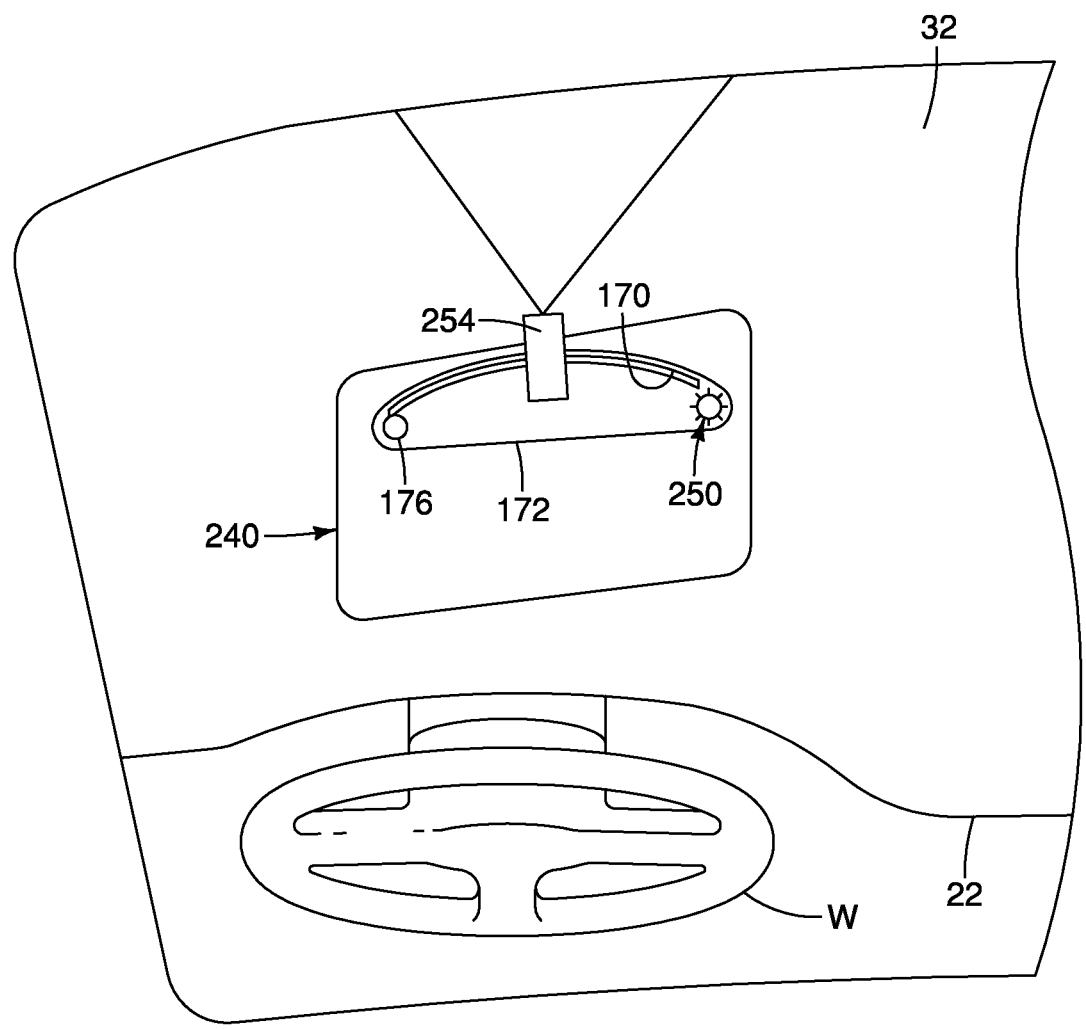
FIG. 27 is a top schematic view of a front area of the passenger compartment looking downward at a shelf covering the instrument panel, showing details of the first positioning mechanism, the second positioning mechanism and the projector with the projector projecting an image to a centered area of the windshield relative to the windshield in accordance with third embodiment.
Figure 28:
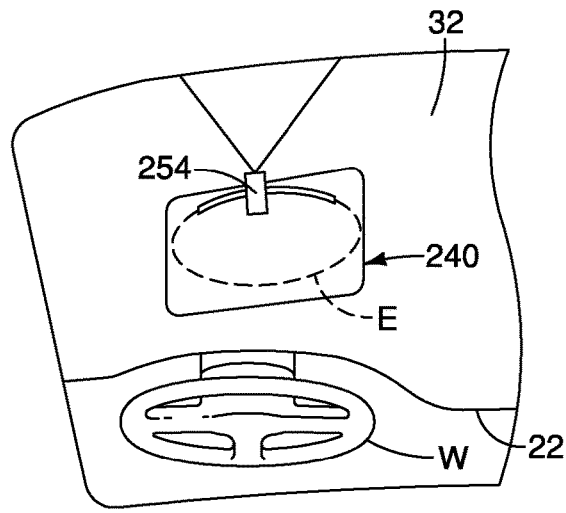
FIG. 28 is another top view of the front area of the passenger compartment showing the projector projecting onto a centered position of the windshield relative to a front seat and the steering wheel in accordance with the third embodiment.
Figure 29:
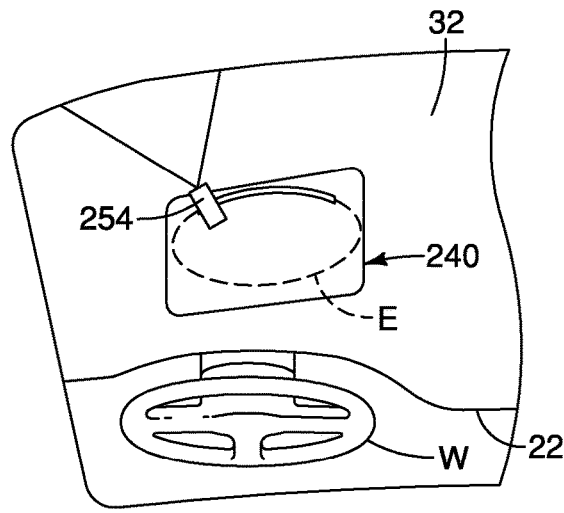
FIG. 29 is another top view of the front area of the passenger compartment showing projector projecting onto the left of the centered position of the windshield relative to a front seat and the steering wheel in accordance with the third embodiment.
Figure 30:
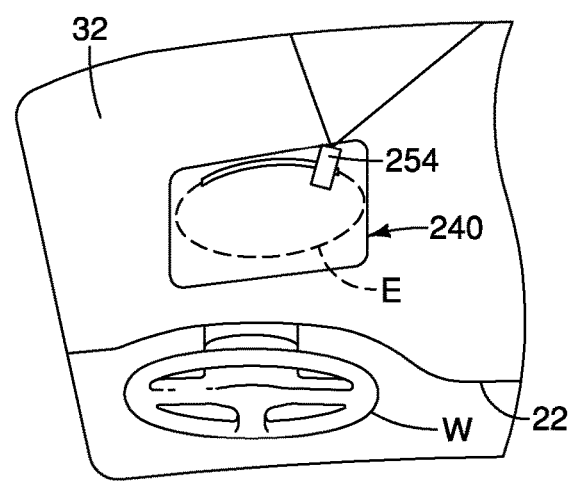
FIG. 30 is another top view of the front area of the passenger compartment showing projector projecting to the right of the centered position of the windshield relative to a front seat and the steering wheel in accordance with the third embodiment.

As shown in FIGS. 25 and 26, the display assembly 240 includes a first positioning mechanism 250, a second positioning mechanism 252 and a projector 254, The display assembly 240 is installed to the instrument panel 22 along the shelf 32, as shown in FIG. 27. The display assembly 240 operates in a manner similar to that of the display assembly 40 of the first embodiment with the projector 254 projecting to areas of the windshield 28, as described above with reference to the first embodiment. As shown in FIGS. 28, 29 and 30, the first positioning mechanism 250 moves the projector 254 along an elliptical path (or oval path) E.

As shown in FIGS. 25-27, the first positioning mechanism 250 includes an arcuate shaped guide plate 170, a belt 172, a motor-powered gear 174 and a guide roller 176, similar to those of the second embodiment. The guide plate 170 is fixed in place and guides movement of the belt 172 along the elliptical path E defined in part by the shape of the arcuate shaped guide plate 170. A base portion 182 of the second positioning mechanism 252 moves along a track 180 in order to maintain the second positioning mechanism 252 in an upright orientation and further guide movement of the second positioning mechanism 252. The base portion 182 of the second positioning mechanism 252 is fixed to the belt 172 such that movement of the belt 172 changes the position of the base portion 182, the second positioning mechanism 252 and the projector 254 when moved by the belt 172. The elliptical path E is shown in FIGS. 28-30.

The second positioning mechanism 152 includes a motor-powered gear that causes the projector 254 to pivot or tilt, about the horizontal axis $A_1''$.

In the third embodiment, the electronic controller 46 controls movement and positioning of the projector 154 in a manner consistent with that described above with respect to the first embodiment. The projector 154 can project the image I to the windshield 28 to place the image I in any of the image positions $I_1$, $I_2$, $I_3$, $I_4$, $I_5$ and $I_6$.

The description in the first embodiment of the distortion compensator 70 also applies to the third embodiment, but with slightly different geometry being taken into consideration since the projector 254 follows an elliptical path for horizontal movement, rather than pivoting as in the first embodiment.

Fourth Embodiment

Figure 31:
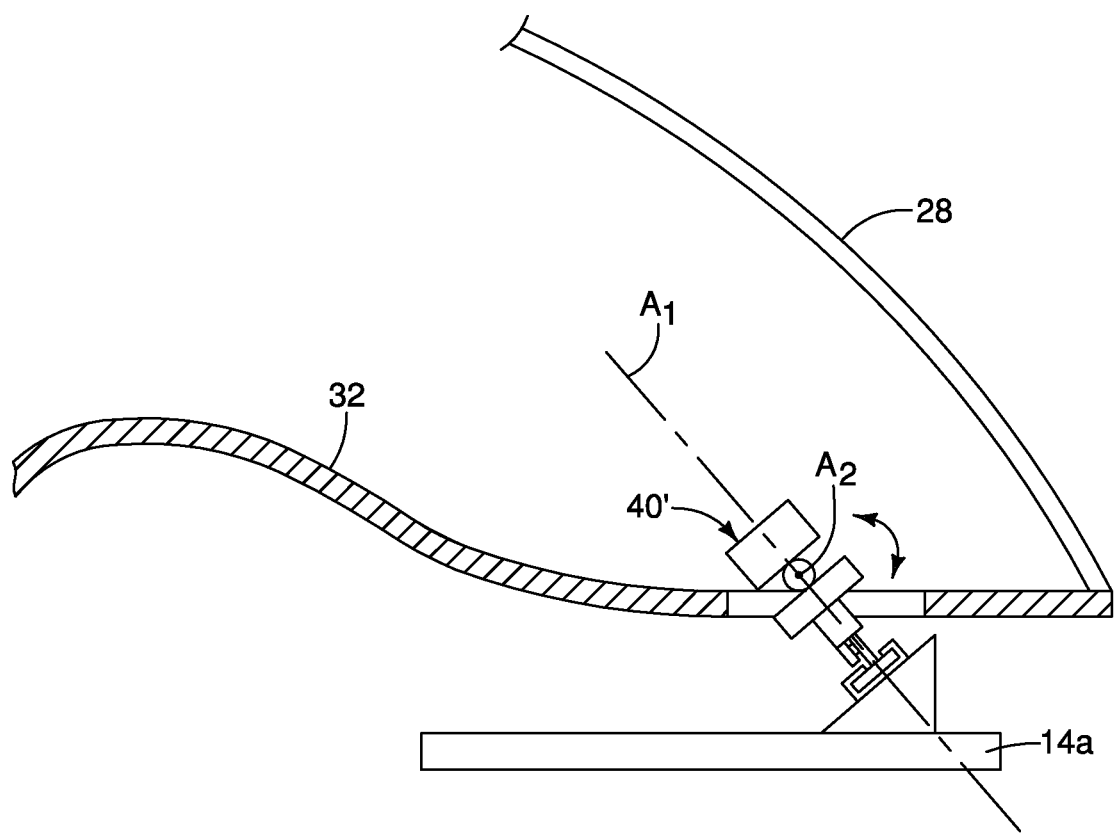
FIG. 31 is a side schematic view of a portion of the passenger compartment, windshield and instrument panel, showing a first positioning mechanism and a second positioning mechanism supporting a projector such that an upright axis about which the projector is pivoted is approximately parallel to the adjacent area of the windshield in accordance with a fourth embodiment.

Referring now to FIG. 31, a display assembly 40' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

In the fourth embodiment, the display assembly 40' is identical to the display assembly 40 of the first embodiment, except that the display assembly 40' is mounted to an inclined surface of the portion 14a of the vehicle body structure 14. The display assembly 40' includes all of the features of the display assembly 40 of the first embodiment.

In the fourth embodiment, the axis $A_1$ is approximately parallel to an inner surface of the windshield 28. This arrangement simplifies some of the distortion compensation processes. Otherwise, the electronic controller operates the display assembly 40' in exactly the same manner as in the first embodiment.

The various vehicle structures and features, other than the HUD system 12, are conventional components that are well known in the art. Since these structures and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part of a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the heads-up display system. Accordingly, these terms, as utilized to describe the present invention should be interpreted relative to a vehicle equipped with the heads-up display system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A heads-up display system, comprising;
a vehicle having a vehicle body structure that includes a windshield and defines a passenger compartment with a vehicle operator seat;
a display assembly installed to a portion of the vehicle body structure within the passenger compartment, the display assembly being configured to display images of at least one of driving related information and vehicle related information on the windshield such that the images are visible to a vehicle operator in the vehicle operator seat while looking at or through the windshield of the vehicle, the display assembly including at least a projector, a first positioning mechanism and a second positioning mechanism coupled to the projector, the first positioning mechanism having a base and a motor, the base being installed to the vehicle body structure and being configured to move the projector about a first axis via operation of the motor and the second positioning mechanism being configured to selectively move the projector about a second axis that is perpendicular to the first axis such that the display assembly is configured to change position of the images relative to the vehicle operator between any one of a plurality of predetermined areas relative to the windshield, including at least a first position centered in front of the vehicle operator, a second position left of first position and a third position right of the first position, the image defining a predetermined aspect ratio with in the first position; and an electronic controller installed within the vehicle and electrically connected to the projection device, the electronic controller being configured to operate the first positioning mechanism and the second positioning mechanism of the display assembly to selectively move the image between the plurality of predetermined areas of the windshield including the first, second and third positions, the electronic controller being further configured to compensate for distortion of the image and maintain the predetermined aspect ratio in response to the image being moved away from the first position toward or to either of the second and third positions.

2. The heads-up display system according to claim 1, wherein
the electronic controller compensates for distortion of the image to maintain the predetermined aspect ratio when the image is moved to a position that is angularly offset from a plane normal to an optical axis of the display assembly.

3. The heads-up display system according to claim 1, wherein
each of the plurality of predetermined areas is located on the windshield.

4. The heads-up display system according to claim 3, further comprising
an input device installed to the vehicle body structure within the passenger compartment and being configured to receive positioning information of the vehicle operator; and
the electronic controller being configured to operate the first positioning mechanism and the second positioning mechanism to selectively move and aim the projector such that the projector projects the images to a determined one of the plurality of predetermined areas of the windshield in response to the positioning information received from the input device.

5. The heads-up display system according to claim 1, further comprising
a keyfob in communication with the electronic controller, the electronic controller storing user information correlated to the keyfob, such that in response to detection of the keyfob, the electronic controller uses the stored user information correlated to the keyfob for initializing operation of the display assembly.

6. A heads-up display system, comprising;
a vehicle having a vehicle body structure that includes a windshield and defines a passenger compartment with a vehicle operator seat;
a display assembly installed to a portion of the vehicle body structure within the passenger compartment, the display assembly having a projection device, a first positioning mechanism coupled to the projection device and a second positioning mechanism coupled to the projection device, the projection device being configured to display images of least one of driving related information and vehicle related information such that the images are visible to a vehicle operator while looking at or through the windshield of the vehicle, the first positioning mechanism being configured to selectively move the projection device in radial directions relative to an upright axis where the radial direction is defined along an arcuately shaped track installed to an upper area of an instrument panel within the passenger compartment, the arcuately shaped track following an elliptically shaped path with the upright axis at least partially defining an ellipse coinciding with the elliptically shaped path and the second positioning mechanism being configured to selectively move the projection device about a horizontal axis;

an input device installed to the vehicle body structure within the passenger compartment and being configured to receive positioning information; and an electronic controller installed within the vehicle and electrically connected to the projection device, the first positioning mechanism, the second positioning mechanism and the input device, the electronic controller being configured to operate the first positioning structure and the second positioning structure to selectively move and aim the projection device such that the projection device projects to a determined one of a plurality of predetermined areas of the windshield in response to the positioning information received by the input device.

7. The heads-up display system according to claim 6, wherein
the projection device includes a projector that projects the images directly to the windshield.

8. The heads-up display system according to claim 6, wherein
the projection device includes a projector and a screen, the projector projecting the images to the screen.

9. The heads-up display system according to claim 6, wherein
the input device is a control panel connected to the electronic controller, the control device being configured for manual input of information to be displayed in the images and configured for manual selection of the positioning information of the images projected to the plurality of predetermined areas of the windshield, and
the electronic controller is further configured to operate the projection device to project onto the windshield the information manually selected via the control panel and position the images in response to the positioning information manually selected via the control panel.

10. The heads-up display system according to claim 6, wherein
the at least one of driving related information and vehicle related information is such that the driving related information includes navigation information, blind spot warnings, communications such as incoming text or incoming phone call warnings and forward emergency braking information, and
the at least one of driving related information and vehicle related information is such that the vehicle related information includes at least vehicle speed, engine sensor readings, radio and audio system information and communication information.

11. The heads-up display system according to claim 6, wherein
the input device is a position sensing device that is one selected from a group of position sensing devices consisting of: a camera installed within the passenger compartment configured to detect position, orientation and movement of the head of the vehicle operator, an infrared sensor configured to detect position, orientation and movement of the head of the vehicle operator, and, an ultrasonic sensor configured to detect position, orientation and movement of the head of the vehicle operator, and the electronic controller being further configured to determine the one of the plurality of predetermined areas of the windshield in response to the positioning information received by the position sensing device.

12. The heads-up display system according to claim 11, wherein the position sensing device is installed to one of the A-pillar, the roof structure adjacent to the windshield and an instrument panel within the passenger compartment of the vehicle.

13. The heads-up display system according to claim 6, wherein the display assembly is installed to one of the A-pillar, the B-pillar, the roof structure and an upper area of an instrument panel within the passenger compartment of the vehicle.

14. A heads-up display system, comprising;

a vehicle having a vehicle body structure that includes a windshield and defines a passenger compartment with a vehicle operator seat;

a display assembly installed to a portion of the vehicle body structure within the passenger compartment, the display assembly having a projection device, a first positioning mechanism coupled to the projection device and a second positioning mechanism coupled to the projection device, the projection device being configured to display images of least one of driving related information and vehicle related information such that the images are visible to a vehicle operator while looking at or through the windshield of the vehicle, the first positioning mechanism being configured to selectively move the projection device in radial directions relative to an upright axis and the second positioning mechanism being configured to selectively move the projection device about a horizontal axis, the first positioning mechanism further including a base and a positioning motor, the positioning motor being attached to the portion of the vehicle body structure such that the base pivots about the upright axis in response to operation of the positioning motor;

an input device installed to the vehicle body structure within the passenger compartment and being configured to receive positioning information; and an electronic controller installed within the vehicle and electrically connected to the projection device, the first positioning mechanism, the second positioning mechanism and the input device, the electronic controller being configured to operate the first positioning structure and the second positioning structure to selectively move and aim the projection device such that the projection device projects to a determined one of a plurality of predetermined areas of the windshield in response to the positioning information received by the input device.

15. The heads-up display system according to claim 14, wherein the upright axis extends upward in a direction parallel to an inner surface of the windshield.

16. The heads-up display system according to claim 15, wherein the image produced by the projection device has a predetermined aspect ratio with the images being projected to an area centered in front of the vehicle operator, the electronic controller is configured to compensate for distortion of the images projected by the projection device to sections of the predetermined areas of the windshield that is angularly offset from a plane normal to an optical axis of the projection device in order to maintain the predetermined aspect ratio.

17. The heads-up display system according to claim 14, wherein the second positioning mechanism is attached to the base and the projection device is attached to the second positioning mechanism with the second positioning mechanism being configured to selectively pivot the projection device about the horizontal axis.

\* \* \* \* \*